Aug. 10, 1954     C. L. E. DE GAUGUE, JR     2,686,140
COMPOSITION BRAKE BLOCK
Filed March 29, 1952
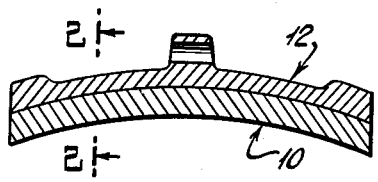
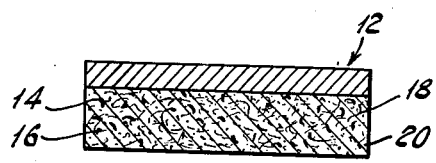
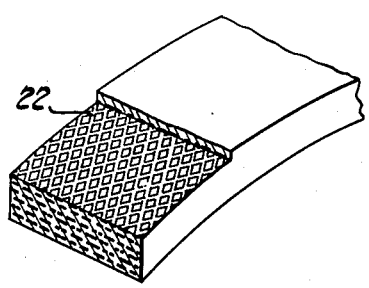
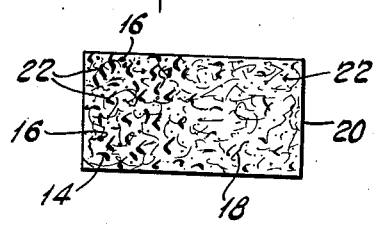
INVENTOR
CHARLES L. E. DE GAUGUE JR.
BY Virgil A. Kline
ATTORNEY Patented Aug. 10, 1954

2,686,140

UNITED STATES PATENT OFFICE 2,686,140

COMPOSITION BRAKE BLOCK

Charles L. E. de Gaugue, Jr., Cokesbury, N. J., assignor to Johns-Manville Corporation, New York, N. Y., a corporation of New York Application March 29, 1952, Serial No. 279,417

29 Claims. (Cl. 154—52)

This invention relates to composition brake blocks and more particularly to a molded brake block of novel composition adapted particularly for braking heavy railway equipment.

This application is a continuation-in-part of my copending U. S. patent application Serial No. 217,790 filed March 27, 1951, which in turn is a continuation-in-part of my U. S. patent application Serial No. 127,864 filed November 17, 1949, now both abandoned.

One of the conventional means of braking railway equipment is by brake shoes of cast iron applied against the steel treads of the wheels, whereby a metal to metal engagement is effected under sufficient applied force to effect deceleration. Compressed air actuated mechanism is usually employed to force the brake shoe into braking engagement with the wheel tread.

An alternative form of railway brake employs engageable rotor and stator discs, the rotor discs being connected to the wheels to rotate therewith, and the stator discs being connected to the stationary frame of the equipment. Brake blocks may be affixed to the face of the stator and applied to the rotor to effect deceleration.

The braking of heavy railway equipment using cast iron shoes requires application of high braking force to hold the shoes in braking contact with the wheels or rotor discs, and efficient and effective deceleration develops a high rate of wear for cast iron brake shoes. While the friction coefficient of a cast iron brake shoe is relatively low and the service life short, it is notable that the friction coefficient of such shoe remains substantially constant in either dry or wet weather. In other words, the presence of moisture does not have a serious adverse effect on the braking efficiency of cast iron shoes.

Various molded composition brake blocks have been heretofore proposed for braking mobile equipment. The usual composition brake block comprises a binder matrix such as rubber or synthetic resin, and friction-imparting filler materials distributed throughout the matrix including particles of metal such as lead and brass, hard rubber particles, and reinforcing fibers such as asbestos. In general such molded composition brake blocks have a considerably higher friction coefficient when dry, as compared to cast iron shoes. However, the friction coefficient of a conventional molded composition brake block is markedly lowered in the presence of moisture. For example, tests have shown that the friction coefficient of a composition brake block when wet may be less than half the dry friction coefficient.

Proposals have also been made to incorporate ferrous metal particles in molded composition friction materials such as automotive brake blocks. These proposals have generally suggested the use of various amounts of iron particles for specific frictional functions, together with certain types of binder matrices such as thermosetting phenolic resins. The use of iron chips has usually been suggested for the purpose of obtaining tougher metallic friction particles than those commonly used such as lead, brass, etc., and also for the purpose of removing heat produced by friction during braking action. Such molded composition brake blocks are not suitable for use in braking high speed railway equipment due to internal structural weaknesses, brittleness, lack of thermal resistance, and rapid wear characteristics of the blocks. Such blocks generally have exhibited a rate of wear as bad as, or worse than, conventional cast iron brake shoes.

An object of the present invention is to provide a molded composition brake block having properties adapting it for braking heavy railway equipment. A particular object is to provide a molded composition brake block having a high friction level and low rate of wear and a wet to dry friction coefficient ratio approximating that of cast iron. Another object is to provide a molded composition brake block which is effective for braking railway equipment under a braking force much lower than conventional practice with cast iron shoes. Another object is to provide a molded composition brake block which is more effective than cast iron shoes for braking railway equipment without developing hot spots and thermal cracking or checking of the wheel treads in contact with the brake block.

With the above objects in view, the invention consists in the improved molded composition brake block which is hereinafter described and more particularly defined by the appended claims.

In the accompanying drawings, in which preferred embodiments of the invention are illustrated, and wherein like reference characters designate like parts:

Fig. 1 shows in perspective a molded composition brake block shaped for mounting on an arcuate brake shoe;

Fig. 2 is a magnified transverse sectional view of the brake block, taken on the line 2—2 of Fig. 1;

Fig. 3 is a fragmental perspective view of a modified metal lath reinforced brake block, with part of the face broken away to show a metal lath reinforcing element in position; and, Fig. 4 is an attempted plan view portrayal of a wearing face of the brake block portrayed in Fig. 3, showing worn portions of an embedded reinforcing lath exposed.

In that embodiment of the invention which is illustrated in Figs. 1 and 2, numeral 10 designates a molded composition brake block of arcuate shape firmly affixed to, or molded integral with, a metal shoe 12 which is adapted for operation by compressed air actuating mechanism (not shown). It will be understood that the invention is not limited as to the shape of the shoe or block, or as to the means for affixing or anchoring the block facing to the shoe.

The present invention is directed to a molded brake block of novel composition having a high friction coefficient level preferably approximating 0.300, as compared to 0.080 for cast iron under comparable railway braking conditions. Another important feature of the present brake block composition is that it exhibits a frictional coefficient when wet which is not substantially less than its dry friction coefficient. Thus, for molded brake blocks formed in accordance with this invention the ratio of wet to dry stopping distance under the same initial speed and braking effectiveness does not usually exceed 1.25. Molded brake blocks within the widest composition range herein disclosed have a friction coefficient level at least triple that of cast iron under high speed braking conditions, and have a friction coefficient when wet which is not less than 75% of the dry friction coefficient.

It is also a particular feature of the present brake block composition that the coefficient of friction of these blocks is relatively constant over the entire range of wheel speeds during the braking activity; whereas the coefficient of friction of cast iron brake shoes increases greatly as the wheel speed decreases. Accordingly, a much smoother braking action is obtained when utilizing brake blocks fabricated according to this invention than is obtained when conventional cast iron shoes are employed; that is brake blocks formed in accordance with this invention do not cause the typical jerky stops commonly experienced with railway equipment using cast iron shoes.

The molded railway brake blocks formed in accordance with the present invention essentially comprise hard ferrous metal particles, preferably granulated or chipped cast iron; long wear organic friction particles, such as common heavily filled hard vulcanized rubber friction particles or conventional resinous friction particles such as granules of cured thermosetting resins as exemplified by polymerized cashew nut shell oil; and a vulcanized in situ hard rubber matrix formed from an elastomer composition containing a relatively large amount of conventional fillers and vulcanizing ingredients. Preferably, the blocks formed in accordance with this invention also contain a suffibstantial amount of reinforcing asbestos fibers.

It is apparent from test results that the excellent frictional characteristics and long service life of the railway brake blocks formed in accordance with this invention are due to a pronounced cooperation between the cast iron particles forming a substantial proportion thereof and the hard, tough elastomer matrix and non-ferrous inorganic and organic filler materials incorporated therein, considering the asbestos fiber and resinous or rubber friction particles as such fillers. The cooperation of these ingredients lends the block characteristics of long life and frictional efficiency, both wet and dry, not attained in any molded friction material heretofore proposed or fabricated, nor exhibited by conventional cast iron railway brake blocks.

Preferably, the railway brake block 10 (Figs. 1 and 2) formed in accordance with this invention will comprise approximately 25-75% by weight of hard ferrous metal, at least 50% of which is in the form of cast iron chips or granules 14; 10-60% by weight of long wear friction particles 16 comprising either hard vulcanized rubber containing, for example, 50-70% by weight of inorganic fillers and vulcanizing ingredients, or conventional resinous friction particles as exemplified by granules of cured thermosetting resins such as polymerized cashew nut shell oil; 0-30% asbestos fibers 18; and 8-32% of a vulcanized in situ rubber matrix 20 formed from a composition comprising 2-12% by weight of the block of a natural or synthetic rubber such as a butadiene-styrene copolymer (Buna GR-S), together with 4-20% by weight of the block of inorganic and organic fillers and vulcanizing ingredients such as sulfur, litharge, ZnO, carbon black, barytes, etc., which rubber matrix may be stiffened with up to 6% by weight of the block of a thermosetting resin such as phenol-aldehyde or cashew nut shell oil resins.

A molded brake block having a composition as set forth in the foregoing is particularly well adapted for use as a railway brake block in place of conventional cast iron brake shoes, inasmuch as the block exhibits relatively stable high friction charasictics when operated either dry or in the presence of water. Test evaluation of such a brake block has shown it to have an average service life about three times that of cast iron under comparable braking conditions, and a high coefficient of friction which is, within rather close limits, essentially constant when tested either dry or in the presence of water. The braking efficiency of the present molded composition brake block is much more uniform; that is, the coefficient of friction is more constant, at both high and low speeds, as compared to cast iron. The dry friction coefficient of the present block containing cast iron is higher than that of a conventional composition brake block of the same matrix composition which contains soft metal particles. Additionally, the frictional efficiency of the blocks formed according to the invention as compared to those containing such common metal friction particles, is even more pronounced when operating under wet conditions. A block of the indicated composition develops a braking efficiency equivalent to cast iron shoes under a braking force (air pressure) averaging about one-third that required for cast iron.

These very important requisites for composition brake blocks for railway service primarily result from the presence in the composition of high proportions of hard cast iron granules or chips and of the hard vulcanized rubber matrix and its non-ferrous fillers, which matrix has good resistance to heat-softening. The presence of 25-75% by weight of hard ferrous metal chiefly in the form of cast iron particles, and at least 50% by volume (75-25% by weight) of non-ferrous inorganic and organic filler and organic binder materials including a binder matrix of relatively heat-stable vulcanized rubber, is necessary to develop a suitably high friction coefficient, a satisfactory ratio between the wet and dry braking performance for heavy duty railroad service, good resistance to generated heat, and a long service life. Preferably, the total ferrous metal content is in the form of cast iron chips, and, when so used, the iron content will usually not exceed 50% by weight. While a greater percentage may be employed, an increase in iron chip content over 50% does not result in any significant improvement of wet/dry ratio, and slightly decreases the desirable long wear life of the block.

The following screen analyses are typical of the size classification of granular cast iron chips which give satisfactory results in the present molded composition brake block:

| Retained on U. S. S. sieve: | Percentage |
|---|---|
| 16 mesh | None |
| 30 mesh | 0–10 |
| 50 mesh | 0–20 |
| 100 mesh | 30–60 |
| 200 mesh | 10–60 |
| Pan | 0–10 |

The invention is not limited to the use of cast iron particles of the size classification shown above, since tests have demonstrated that particles or chips of various sizes give effective results. Preferably, at least 50% of the particles will be sized through 50 and retained on 200 mesh.

In order that the present molded composition brake block have a high coefficient of friction and long wear characteristics, it is preferred that it contain a comparatively high percentage of long wear friction particles comprising hard vulcanized rubber friction particles which may contain a stiffener such as a phenolaldehyde or cashew nut shell oil resin, or conventional resinous friction particles comprising granules of a thermosetting resin such as polymerized cashew nut shell oil. A suitable hard rubber friction particle in accordance with the present invention is sized largely in the range −35 mesh +100 mesh and may, for example, comprise the vulcanization product of approximately the following composition:

| | Percentage by weight |
|---|---|
| Vulcanizable reclaimed rubber | 12–24 |
| Phenolic-aldehyde resin | 0–6 |
| Polymerized cashew nut shell oil | 12–24 |
| Sulfur | 3–9 |
| Barytes | 6–12 |
| Litharge | 20–40 |
| Graphite | 0–6 |
| Lead | 0–8 |

Obviously, this composition may be varied. For example, the vulcanizable reclaimed rubber may be replaced by natural rubber, or by the heat-stable synthetic rubbers herein mentioned; the high proportion of litharge may be replaced in part by zinc oxide and by increasing proportions of other named fillers.

An alternative form of molded composition brake block is illustrated in Figs. 3 and 4, wherein several layers of expanded steel grid lath 22 or equivalent hard ferrous metal reinforcing fabric are incorporated in the block. While these reinforcing grids obviously comprise a part of the total ferrous metal content of those blocks in which they are incorporated, by far the greatest part of the ferrous metal will be present in the form of cast iron chips. The ferrous metal content due to the grids alone should comprise no more than about 15% by weight of the total block composition.

When the hard ferrous metal chips comprise up to 50% by weight of the block, it will be noted that this metal content does not exceed on the average 25% by volume at the exposed wear face of the block, with the result that the block develops a much higher coefficient of friction than, and exhibits a wear life substantially greater than, that of a standard cast iron shoe. In the molded and cured block the cast iron particles, asbestos fibers and long wear friction particles are distributed uniformly throughout the hard rubber binder matrix. In other words, the asbestos fiber and long wear friction particles may be considered to make up a part of the filler content of the hard rubber, supplementing the content of conventional filler and vulcanizing materials.

Brake blocks of the type illustrated may be manufactured substantially as follows: A suitable molding composition for the block is first prepared in accordance with the formulas heretofore set forth. After thoroughly mixing the particulate ingredients, the mixture is charged into a mold of suitable shape. In the event that expanded metal lath or equivalent metal reinforcing fabric is to be used, layers of such reinforcing fabric are introduced into the mold at spaced intervals paralleling the block face during the operation of charging the mold with the composition material. After filling the mold to predetermined depth with the plastic molding mixture, with or without metal reinforcing fabric, the uncured and plastic block is densified, hardened, and cured within the mold by simultaneous application of high temperature and pressure. Such curing may, for example, take place under a pressure of 2000–5000 (preferably 2500–3000) lbs. per square inch at a temperature equivalent to the temperature of steam at 90 lbs. pressure. In this manner the block is molded to final dimensions and shape, and the various ingredients of the composition are strongly bonded to each other to form a strong unitary block.

The following are examples of various molded composition brake blocks for use in railway brake systems, and their general method of preparation. It is understood, of course, that the compositions of, and methods for producing, these blocks are exemplary and are not to be considered to limit the invention to the particular compositions and operating conditions outlined. All percentages indicated in the examples are by weight.

*Example I*

A railway brake block was prepared by thoroughly mixing a composition comprising:

| | |
|---|---|
| Cast iron chips | 30% |
| Hard rubber friction particles | 43% |
| Asbestos fiber | 12% |
| Hard rubber matrix | 15% |
|   Butadiene-styrene (Buna G R–S) | 3% |
|   Polymerizable cashew nut shell oil resin | 2% |
|   Sulfur | 1.4% |
|   Litharge | 4.3% |
|   Zinc oxide | 3.6% |
|   Carbon black | 0.5% |
|   Hexamethylenetetramine | 0.2% | and molding said composition to the desired dimensions with a pressure of approximately 2500 lbs./sq. in. and at a temperature of approximately 300° F. The block exhibited a coefficient of friction of 0.325 as compared to 0.180 for a cast iron shoe under the same braking conditions, had a wet/dry stopping distance ratio of 1.10 and had a wear life of 3.6 times that of a standard cast iron railway block.

*Example II*

A railway block was prepared in the same manner as that in Example I from a composition containing the same ingredients in the same proportions utilized in Example I, except for a cast iron chip content of 50% instead of 30% and a hard rubber friction particle content of 23% instead of 43%. This block had a coefficient of friction of 0.326 as compared to 0.081 for a cast iron shoe under the same braking conditions, had equally efficient friction characteristics when both wet and dry, that is, had a wet/dry stopping distance ratio of 1.0, and had a wear life 1.4 times that of a standard cast iron railway brake shoe.

The invention disclosed herein is not limited to the use of the butadiene-styrene rubber defined in the above examples for the heat resistant vulcanized elastomer matrix. A satisfactory matrix may comprise in place of butadiene-styrene, a vulcanized synthetic rubber of the Buna N type, i. e., butadiene-acrylonitrile. An alternative, but somewhat less satisfactory, matrix may comprise a polychloroprene such as chlorbutadiene, or any other heat resistant vulcanized rubber including natural rubber, which will not pass through an inversion or softening point during heat hardening cure or in use. It is preferred to reinforce the vulcanized rubber matrix with up to 6% by weight of the block of a thermosetting resin of the phenolic-aldehyde or cashew nut shell oil type.

It will be understood that the details given are for the purpose of illustration, not restriction, and that variations within the spirit of the invention are intended to be included in the scope of the appended claims.

What I claim is:

1. A molded composition brake block having good wet and dry friction characteristics and a long service life, comprising 25–75% by weight of hard ferrous metal at least 50% of which is in the form of cast iron particles, and at least 50% by volume of non-ferrous inorganic and organic filler and organic binder materials including a binder matrix comprising a heat resistant hard vulcanized in situ rubber selected from the group consisting of natural rubber, polychlorbutadiene, and butadiene-styrene and butadiene-acrylontrile copolymers.

2. A molded composition brake block having good wet and dry friction characteristics and a long service life, comprising 25–75% by weight of hard ferrous metal at least 50% of which is in the form of cast iron particles, and at least 50% by volume of non-ferrous inorganic and organic filler and organic binder materials including a binder matrix comprising a heat resistant hard vulcanized in situ butadiene-styrene copolymer synthetic rubber.

3. A molded composition brake block having good wet and dry friction characteristics and a long service life, comprising 25–75% by weight of hard ferrous metal at least 50% of which is in the form of cast iron particles, and at least 50% by volume of non-ferrous inorganic and organic filler and organic binder materials including a binder matrix comprising a heat resistant hard vulcanized in situ butadiene-acrylonitrile copolymer synthetic rubber.

4. A molded composition brake block having good wet and dry friction characteristics and a long service life, comprising 25–75% by weight of hard ferrous metal at least 50% of which is in the form of cast iron particles, and at least 50% by volume of non-ferrous inorganic and organic filler and organic binder materials including a binder matrix comprising a heat resistant vulcanized in situ rubber selected from the group consisting of natural rubber, polychlorbutadiene and butadiene-styrene and butadiene-acrylonitrile copolymers, said binder matrix containing up to 6% by weight of the block of a thermosetting resin stiffener.

5. A molded composition brake block having good wet and dry friction characteristics and a long service life, comprising 25–75% by weight of hard ferrous metal at least 50% of which is in the form of cast iron particles, and at least 50% by volume of non-ferrous inorganic and organic filler and organic binder materials including a binder matrix comprising a heat resistant hard vulcanized in situ butadiene-styrene copolymer synthetic rubber, said binder matrix containing up to 6% by weight of the block of a thermosetting resin stiffener.

6. A molded composition brake block having good wet and dry friction characteristics and a long service life, comprising 25–75% by weight of hard ferrous metal at least 50% of which is in the form of cast iron particles, and at least 50% by volume of non-ferrous inorganic and organic filler and organic binder materials including a binder matrix comprising a heat resistant hard vulcanized in situ butadiene-acrylonitrile copolymer synthetic rubber, said binder matrix containing up to 6% by weight of the block of a thermosetting resin stiffener.

7. A molded composition brake block having good wet and dry friction characteristics and a long service life, comprising 25–75% by weight of hard ferrous metal at least 50% of which is in the form of cast iron particles, from 10–60% by weight of long wearing organic friction particles, and from 8–32% of a binder matrix comprising the in situ vulcanization product of a composition comprising a rubber selected from the group consisting of a natural rubber, polychlorbutadiene and butadiene-styrene and butadiene-acrylonitrile copolymers and a high proportion of inorganic fillers and vulcanizing ingredients.

8. A molded composition brake block having good wet and dry friction characteristics and a long service life, comprising 25–75% by weight of hard ferrous metal at least 50% of which is in the form of cast iron particles, from 10–60% by weight of long wearing organic friction particles, and from 8–32% of a binder matrix comprising the in situ vulcanization product of a composition comprising a butadiene-styrene copolymer and a high proportion of inorganic fillers and vulcanizing ingredients.

9. A molded composition brake block having good wet and dry friction characteristics and a long service life, comprising 25–75% by weight of hard ferrous metal at least 50% of which is in the form of cast iron particles, from 10–60% by weight of long wearing organic friction particles, and from 8–32% of a binder matrix comprising the in situ vulcanization product of a composition comprising a butadiene-acrylonitrile copolymer and a high proportion of inorganic fillers and vulcanizing ingredients.

10. A molded composition brake block having good wet and dry friction characteristics and a long service life, comprising 25–75% by weight of hard ferrous metal at least 50% of which is in the form of cast iron particles, from 10–60% by weight of long wearing organic friction particles, and from 8–32% of a binder matrix comprising the in situ vulcanization product of a composition comprising a rubber selected from the group consisting of a natural rubber, polychlorbutadiene and butadiene-styrene and butadiene-acrylonitrile copolymers and a high proportion of inorganic fillers and vulcanizing ingredients, said binder matrix containing up to 6% by weight of the block of a thermosetting resin stiffener.

11. A molded composition brake block having good wet and dry friction characteristics and a long service life, comprising 25–75% by weight of hard ferrous metal at least 50% of which is in the form of cast iron particles, from 10–60% by weight of long wearing organic friction particles, and from 8–32% of a binder matrix comprising the in situ vulcanization product of a composition comprising a butadiene-styrene copolymer and a high proportion of inorganic fillers and vulcanizing ingredients, said binder matrix containing up to 6% by weight of the block of a thermosetting resin stiffener.

12. A molded composition brake block having good wet and dry friction characteristics and a long service life, comprising 25–75% by weight of hard ferrous metal at least 50% of which is in the form of cast iron particles, from 10–60% by weight of long wearing organic friction particles, and from 8–32% of a binder matrix comprising the in situ vulcanization product of a composition comprising a butadiene-acrylonitrile copolymer and a high proportion of inorganic fillers and vulcanizing ingredients, said binder matrix containing up to 6% by weight of the block of a thermosetting resin stiffener.

13. A molded composition brake block having good wet and dry friction characteristics and a long service life, comprising 25–75% by weight of hard ferrous metal at least 50% of which is in the form of cast iron particles, from 10–60% by weight of long wearing organic friction particles, up to 30% asbestos fiber, and from 8–32% of a binder matrix comprising the in situ vulcanization product of a composition comprising a rubber selected from the group consisting of a natural rubber, polychlorbutadiene and butadiene-styrene and butadiene-acrylonitrile copolymers and a high proportion of inorganic fillers and vulcanizing ingredients.

14. A molded composition brake block having good wet and dry friction characteristics and a long service life, comprising 25–75% by weight of hard ferrous metal at least 50% of which is in the form of cast iron particles, from 10–60% by weight of long wearing organic friction particles, up to 30% asbestos fiber, and from 8–32% of a binder matrix comprising the in situ vulcanization product of a composition comprising a butadiene-styrene copolymer and a high proportion of inorganic fillers and vulcanizing ingredients.

15. A molded composition brake block having good wet and dry friction characteristics and a long service life, comprising 25–75% by weight of hard ferrous metal at least 50% of which is in the form of cast iron particles, from 10–60% by weight of long wearing organic friction particles, up to 30% asbestos fiber, and from 8–32% of a binder matrix comprising the in situ vulcanization product of a composition comprising a butadiene-acrylonitrile copolymer and a high proportion of inorganic fillers and vulcanizing ingredients.

16. A molded composition brake block having good wet and dry friction characteristics and a long service life, comprising 25–75% by weight of hard ferrous metal at least 50% of which is in the form of cast iron particles, from 10–60% by weight of long wearing organic friction particles, up to 30% asbestos fiber, and from 8–32% of a binder matrix comprising the in situ vulcanization product of a composition comprising a rubber selected from the group consisting of a natural rubber, polychlorbutadiene and butadiene-styrene and butadiene-acrylonitrile copolymers and a high proportion of inorganic fillers and vulcanizing ingredients, said binder matrix containing up to 6% by weight of the block of a thermosetting resin stiffener.

17. A molded composition brake block having good wet and dry friction characteristics and a long service life, comprising 25–75% by weight of hard ferrous metal at least 50% of which is in the form of cast iron particles, from 10–60% by weight of long wearing organic friction particles, up to 30% asbestos fiber, and from 8–32% of a binder matrix comprising the in situ vulcanization product of a composition comprising a butadiene-styrene copolymer and a high proportion of inorganic fillers and vulcanizing ingredients, said binder matrix containing up to 6% by weight of the block of a thermosetting resin stiffener.

18. A molded composition brake block having good wet and dry friction characteristics and a long service life, comprising 25–75% by weight of hard ferrous metal at least 50% of which is in the form of cast iron particles, from 10–60% by weight of long wearing organic friction particles, up to 30% asbestos fiber, and from 8–32% of a binder matrix comprising the in situ vulcanization product of a composition comprising a butadiene-acrylonitrile copolymer and a high proportion of inorganic fillers and vulcanizing ingredients, said binder matrix containing up to 6% by weight of the block of a thermosetting resin stiffener.

19. A molded composition brake block having good wet and dry friction characteristics and a long service life, comprising 25–75% by weight of hard ferrous metal at least 50% of which is in the form of cast iron particles, from 10–60% by weight of long wearing organic friction particles, and from 8–32% of a binder matrix comprising the in situ vulcanization product of a composition comprising a rubber selected from the group consisting of a natural rubber, polychlorbutadiene and butadiene-styrene and butadiene-acrylonitrile copolymers and a high proportion of inorganic fillers and vulcanizing ingredients, said block being reinforced with a hard ferrous metal grid sheet disposed in spaced relation substantially parallel to the friction face of the element.

20. A molded composition brake block having good wet and dry friction characteristics and a long service life, comprising 25–75% by weight of hard ferrous metal at least 50% of which is in the form of cast iron particles, from 10–60% by weight of long wearing organic friction particles, up to 30% asbestos fiber, and from 8–32% of a binder matrix comprising the in situ vulcanization product of a composition comprising a rubber selected from the group consisting of a natural rubber, polychlorbutadiene and butadiene-styrene and butadiene-acrylonitrile copolymers and a high proportion of inorganic fillers and vulcanizing ingredients, said binder matrix containing up to 6% by weight of the block of the thermosetting resin stiffener, and said block being reinforced with a hard ferrous metal grid sheet disposed in spaced relation substantially parallel to the friction face of the element.

21. A molded composition brake block having good wet and dry friction characteristics and a long service life, comprising 25–75% by weight of hard ferrous metal at least 50% of which is in the form of cast iron particles, and at least 50% by volume of non-ferrous inorganic and organic filler and organic binder materials including a binder matrix comprising heat resistant hard vulcanized in situ natural rubber.

22. A molded composition brake block having good wet and dry friction characteristics and a long service life, comprising 25–75% by weight of hard ferrous metal at least 50% of which is in the form of cast iron particles, and at least 50% by volume of non-ferrous inorganic and organic filler and organic binder materials including a binder matrix comprising heat resistant hard vulcanized in situ natural rubber, said binder matrix containing up to 6% by weight of the block of a thermosetting resin stiffener.

23. A molded composition brake block having good wet and dry friction characteristics and a long service life, comprising 25–75% by weight of hard ferrous metal at least 50% of which is in the form of cast iron particles, from 10–60% by weight of long wearing organic friction particles, and from 8–32% of a binder matrix comprising the in situ vulcanization product of a composition comprising natural rubber and a high proportion of inorganic fillers and vulcanizing ingredients.

24. A molded composition brake block having good wet and dry friction characteristics and a long service life, comprising 25–75% by weight of hard ferrous metal at least 50% of which is in the form of cast iron particles, from 10–60% by weight of long wearing organic friction particles, and from 8–32% of a binder matrix comprising the in situ vulcanization product of a composition comprising natural rubber and a high proportion of inorganic fillers and vulcanizing ingredients, said binder matrix containing up to 6% by weight of the block of a thermosetting resin stiffener.

25. A molded composition brake block having good wet and dry friction characteristics and a long service life, comprising 25–75% by weight of hard ferrous metal at least 50% of which is in the form of cast iron particles, from 10–60% by weight of long wearing organic friction particles, up to 30% asbestos fiber, and from 8–32% of a binder matrix comprising the in situ vulcanization product of a composition comprising natural rubber and a high proportion of inorganic fillers and vulcanizing ingredients.

26. A molded composition brake block having good wet and dry friction characteristics and a long service life, comprising 25–75% by weight of hard ferrous metal at least 50% of which is in the form of cast iron particles, from 10–60% by weight of long wearing organic friction particles, up to 30% asbestos fiber, and from 8–32% of a binder matrix comprising the in situ vulcanization product of a composition comprising natural rubber and a high proportion of inorganic fillers and vulcanizing ingredients, said binder matrix containing up to 6% by weight of the block of a thermosetting resin stiffener.

27. A molded composition brake block having good wet and dry friction characteristics and a long service life, comprising approximately 30% by weight of cast iron chips, approximately 43% by weight of hard rubber friction particles, approximately 12% asbestos fiber, and approximately 15% of a binder matrix comprising the in situ vulcanization product of a composition comprising a rubber selected from the group consisting of a natural rubber, polychlorbutadiene, butadiene-styrene and butadiene-acrylonitrile copolymers, and a high proportion of inorganic fillers and vulcanizing ingredients.

28. A molded composition brake block having good wet and dry friction characteristics and a long service life, comprising approximately 30% by weight of cast iron chips, approximately 43% by weight of hard rubber friction particles, approximately 12% asbestos fiber, and approximately 15% of a binder matrix comprising the in situ vulcanization product of a composition comprising natural rubber and a high proportion of inorganic fillers and vulcanization ingredients.

29. A molded composition brake block having good wet and dry friction characteristics and a long service life, comprising approximately 30% by weight of cast iron chips, approximately 43% by weight of hard rubber friction particles, approximately 12% asbestos fiber, and approximately 15% of a binder matrix comprising the insitu vulcanization product of a composition comprising a butadiene-styrene copolymer and a high proportion of inorganic fillers and vulcanization ingredients, said binder matrix containing approximately 2% by weight of the block of a thermosetting resin stiffener.

References Cited in the file of this patent

UNITED STATES PATENTS

| Number | Name | Date |
| --- | --- | --- |
| 2,410,924 | Blume et al. | Nov. 12, 1946 |
| 2,428,298 | Spokes et al. | Sept. 30, 1947 |

FOREIGN PATENTS

| Number | Country | Date |
| --- | --- | --- |
| 272,478 | Great Britain | Feb. 16, 1928 |